June 22, 1937.   H. H. BEVERAGE   2,084,760
SYSTEM FOR RADIO SPECTROGRAPHY
Filed April 10, 1934

INVENTOR
H.H. BEVERAGE
BY
ATTORNEY

Patented June 22, 1937

2,084,760

UNITED STATES PATENT OFFICE 2,084,760

SYSTEM FOR RADIO SPECTROGRAPHY

Harold H. Beverage, Riverhead, N. Y., assignor to Radio Corporation of America, a corporation of Delaware Application April 10, 1934, Serial No. 719,827

16 Claims. (Cl. 250—1)

In many cases it is necessary to analyze the sideband spectrum which is being radiated by a transmitting station. If the transmitter is being over-modulated, the sidebands may be numerous and may extend over a wide frequency band thereby creating interference on neighboring channels. This difficulty occurs quite frequently in the case of transmitters used for telegraphic service wherein the transmitters are modulated to overcome the effects of fading.

In order to measure the radio spectrum emitted by a given transmitter, it is necessary to use a receiving device which is sharp enough to select each sideband independently of the carrier and all of the other sidebands. After a given sideband has been isolated, its intensity may be measured in comparison with the intensity of the carrier. It is also necessary to measure the frequency of each sideband in relation to the carrier.

In the past, these spectrum measurements have been made manually by using a receiver terminating in a narrow band-pass filter with a vacuum tube voltmeter associated with the output of the band-pass filter. The frequency and the intensity of each sideband had to be carefully measured, each in turn, so that this process was very long and tedious, particularly if the transmitting station was sending only intermittent test letters which is frequently the case.

It is the purpose of my invention to make these measurements automatically or semi-automatically with great speed as compared to the methods used in the prior art. Briefly I propose to use a cathode ray tube in which the horizontal axis is made proportional to the frequency while the vertical axis is proportional to the intensity of the individual sidebands and the carrier. By this method a pattern of the carrier and the numerous sidebands is built up on the cathode ray tube and this pattern may be photographed or each sideband may be measured with a suitable scale.

Figure 1:
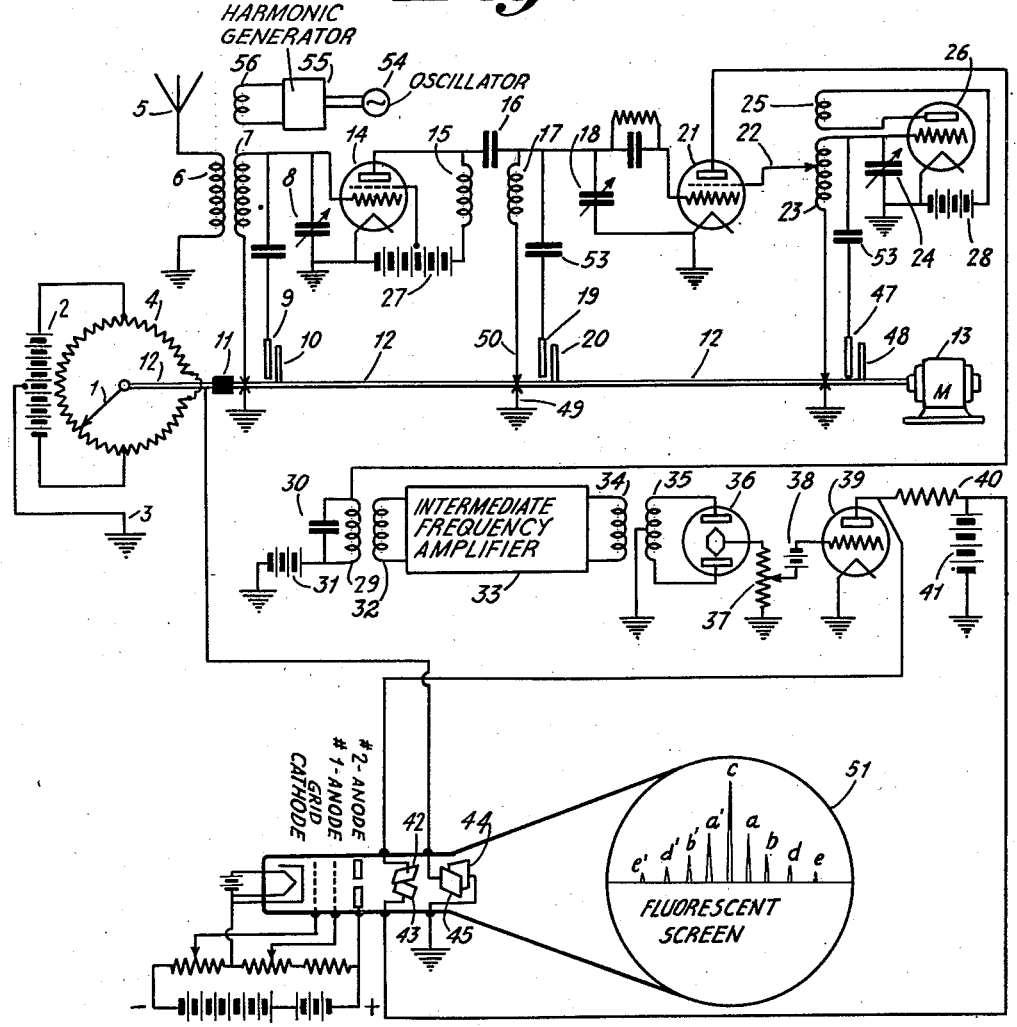
Figure 2:
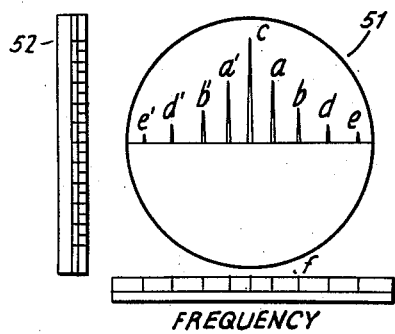

The novel features of my invention have been pointed out with particularity in the claims appended hereto. The nature and operation of my invention will be better understood by the following detailed description thereof and therefrom when read in connection with the attached drawing in which:

Figure 1 is a circuit diagram including the essential elements for carrying out my invention; while, Figure 2 illustrates the manner in which the components of the wave analyzed by the circuit arrangement of Figure 1 appear on a visual indicator connected with the circuit of Figure 1.

Referring to Figure 1, an antenna 5 includes an inductance 6 coupled to an inductance 7. The inductance 7 may be tuned by a variable condenser 8 and the parallel tuned circuit may be connected as shown between the control grid and cathode of a thermionic tube 14 which serves to amplify any radio frequency energy picked up by the antenna. The anode electrode of tube 14 may be coupled by way of a choking inductance 15 and coupling condenser 16 to the control grid of a thermionic detector 21. The input circuit of the detector 21 may include an inductance 17 tuned by a variable capacity 18, the parallel circuit being coupled as shown between the control grid and cathode of tube 21. An oscillation generator comprising a tube 26 having its control grid and anode connected to its cathode by way of coupled circuits including an anode inductance 25 and an inductance 23 and tuning capacity 24 connected as shown between the control grid and cathode of tube 26 may be used to produce sustained oscillations of the desired frequency. The oscillations produced in 26 and its circuits may be impressed on an additional electrode 22 in the detector by means of a lead connected as shown to a movable point on the inductance 23.

The anode electrode of tube 21 is connected as shown to an inductance 29 which may be tuned to the desired intermediate frequency by a capacity 30. The inductance 29 is coupled as shown to an inductance 32 connected with an intermediate frequency amplifier 33. The intermediate frequency amplifier 33 is connected with an inductance 34 which impresses amplified intermediate frequency energy on an inductance 35 connected with the input electrodes of a full wave rectifier 36. The intermediate frequency amplifier should include tuned filter circuits and should be extremely selective. Preferably the intermediate frequency amplifier 33 includes a crystal filter of the type disclosed in Hansell United States application No. 564,770, filed Sept. 24, 1931, Patent #2,001,387, dated May 14, 1935. The rectified current in the output of the full wave rectifier 36 passes through a load resistor 37. The thermionic tube 39 has its control grid and cathode connected as shown by way of a source 38 across a variable portion of 37. The source 38 supplies a suitable bias to the control grid of 39. This bias may be adjusted so that when no energy is being received from the intermediate frequency amplifier, tube 39 is cut off and there is no voltage drop through resistance 40 connected between the anode and cathode of 39. On the other hand, when energy is received from the intermediate frequency amplifier, a positive potential drop is developed across resistance 37 and tube 39 draws anode current from battery 41 through resistance 40 in proportion to the energy received from the intermediate frequency amplifier. This relation is substantially linear if the resistance 37 is made high enough as compared to the impedance of the rectifier 36. The voltage drop across the resistance 40 is applied as shown by leads to the control or deflecting plates 42 and 43 of a cathode ray tube. The cathode ray tube may include an electron stream producing electrode energized as shown. The cathode ray beam is deflected from its normal path vertically, an amount proportional to the voltage supplied to the control plates 42 and 43. If the rectifier system and the coupling tube 39 and resistance 40 are made linear by the method disclosed above, the deflection of the stream will be proportional to the intensity of the carrier or particular sideband producing the intermediate frequency energy which passes through the intermediate frequency amplifier. Obviously, if the receiver is tuned through the frequency spectrum of the wave to be energized, the vertical deflection of the electron stream in the cathode ray tube will indicate the relative intensities of the several sidebands and the carrier as they are passed through, and if the cathode ray beam is also moved horizontally in proportion to the amount of frequency shift produced in the tuning of the receiver, each sideband will be spread out in its proper place in relation to the carrier both as to frequency spacing and as to amplitude.

In my invention I create this spread by automatically shifting the stream horizontally, an amount proportional to the change in frequency as the receiver is tuned. To do this, a motor 13 drives a shaft 12 which in turn drives three small variable condensers comprising rotor plates 48, 20 and 10. In addition to this, these rotor plates cooperate with corresponding stator plates 47, 19 and 9 to tune the oscillator, the detector and the radio frequency amplifier respectively. In addition, the shaft 12 also drives a contact point 1 on a potentiometer 4. The contact point 1 is insulated from ground by insulating bushing 11. Condenser plates 9 and 10 tune the input to the radio frequency amplifier, plates 19 and 20 change the tuning of the detector and condenser plates 47 and 48 change the frequency of the oscillator. These condensers are so proportioned that the oscillator and the tuned circuits of the receiver are kept in step to produce an intermediate frequency wave of the desired frequency. The range which may be covered by these small condensers may be adjusted by varying the value of the padding condensers 53 which are connected in series with the variable condensers as shown.

From the above it will be obvious that the position of the contact arm 1 will be synchronous with the position of the rotors 10, 20 and 48 of the variable condensers since all of these devices are driven by shaft 12. Consequently, the varying voltages drawn from source 2 connected with the potentiometer 4 will be applied by way of line L to plate 45 of the cathode ray tube, plate 44 of which is grounded, and will move the electron stream horizontally in proportion to the change of frequency in the receiver. The path followed by the stream may be made visible in any manner. For example, the cathode ray tube may include a screen or target on which the beam falls and adjustments may be made such that the carrier C will appear in the center of the screen or target, while the pairs of sidebands $a$—$a'$, $b$—$b'$, $d$—$d'$, $e$—$e'$ will appear as shown at 51 of Figure 2, which represents the screen of the cathode ray tube. The screen of the cathode ray tube may be photographed or the intensity of each sideband may be measured with a scale 52 on or adjacent to the screen, or a piece of thin paper may be placed over the cathode ray screen and the sideband intensities may be drawn upon the paper since the pattern may be seen through the paper. In cases where it is possible to operate the motor 13 at several revolutions per second, a fixed pattern may be made to appear on the cathode ray screen. However, in many cases this may involve some difficulties and it will be necessary to operate the motor at a lower speed such as one to two revolutions per second. In this case the sidebands are created on the screen one after the other very rapidly and if fluorescent material is used so that the light will persist for a second or more, a complete pattern may be seen even though the motor 13 is turning quite slowly. The horizontal scale on the cathode ray screen may be readily calibrated in terms of frequency by introducing a pair of known frequencies on the screen from a source of known frequency. A convenient method for doing this is shown in Figure 1 wherein 54 is a piezo-electric oscillator coupled through a suitable harmonic generator 55 to an inductance 56, which may in turn be coupled to the input of the receiver. By impressing waves of frequency which are known on the rectifier and on the cathode ray tube the horizontal scale may be calibrated. A similar method of calibration has been described by Mr. Braaten and Mr. Peterson in an I. R. E. paper entitled "The Precision Frequency Measuring System of R. C. A. Communications, Inc." in June 1932.

While I have shown a preferred form of my invention, it is obvious that there are several possible modifications without departing from the scope of my invention. For example, while I have shown only one stage of radio frequency amplification in tube 14, I could use as many stages as might be deemed necessary by merely adding more condensers which may be driven by shaft 12. It is also obvious that if the range to be covered is not so much as to extend beyond the limits where the selectivity of the high frequency circuits becomes appreciable, it will be unnecessary to vary the tuning of the high frequency circuits and only the oscillator condenser 47—48 and the potentiometer arm 1 will have to be driven by the motor 13. While I have shown the rectifier 36 associated with tube 39, it is obvious that I could apply the output of the intermediate frequency amplifier 33 directly to the cathode ray control plates 42 and 43, in which case the pattern on the cathode ray screen would be the same as that shown excepting that it would extend equally above and below the center line. Also, while I mention that a crystal filter is preferable for obtaining the very sharp selectivity in the intermediate frequency amplifier 33, it would also be possible to beat the frequency down to audio frequency instead of intermediate frequency, enabling one to use a narrow audio frequency band-pass filter.

Having thus described my invention and the operation thereof, what I claim is:

1. The method of analyzing energy including the carrier and sets of upper and lower side bands, resulting from the modulation of a carrier wave by modulating potentials which includes the steps of, producing direct current impulses the amplitude of which are characteristic of the amplitude of the said carrier and various side bands, separating said impulses as to time by intervals characteristic of the frequency spacing between said sidebands and said side bands and carrier and producing indications characteristic of the amplitude of said impulses and of the time intervals therebetween.

2. The method of analyzing the energy including the carrier and sets of upper and lower sideband waves, resulting from the modulation of a carrier by a modulating potential to produce modulation which includes the steps of, producing direct current impulses the amplitude of which are characteristic of the amplitude of the said carrier and various sidebands, producing visual indications of the amplitude of said impulses, and separating said visual indications as to time by intervals characteristic of the frequency spacing between said sidebands and said sidebands and carrier.

3. The method of analyzing the carrier energy and sideband energy resulting from the modulation of a carrier by a modulating potential which includes the steps of, producing direct current impulses the amplitude of which are characteristic of the amplitude of the said carrier and various sidebands, producing potential variations characteristic of the amplitude of said impulses, producing an electron stream, applying said potential variations to said electron stream to influence the path thereof to thereby produce visual indications, and simultaneously influencing the path of said electron stream to separate said visual indications by time intervals characteristic of the frequency differences between said carrier and sidebands.

4. The method of analyzing energy including the carrier and sets of upper and lower sidebands, resulting from the modulation of a carrier wave by modulating potentials which includes the steps of, producing impulses the amplitude of which are proportional to the intensity of the said carrier and various sidebands respectively, separating said impulses as to time by intervals proportional to the frequency spacing between said sidebands and said sidebands and carrier, and producing visual indications of said impulses which are characteristic of the amplitude thereof and of the spacing thereof.

5. The method of analyzing the energy including the carrier and sets of upper and lower sideband waves, resulting from the modulation of a carrier by a modulating potential to produce modulation which includes the steps of, producing impulses the amplitude of which are proportional to the intensity of the said carrier and various sidebands respectively, producing visual indications of the amplitude of said impulses, and separating said visual indications as to time by intervals characteristic of the frequency spacing between said sidebands and said sidebands and carrier.

6. The method of analyzing the carrier energy and sideband energy resulting from the modulation of a carrier by a modulating potential which includes the steps of, producing impulses the amplitude of which are characteristic of the amplitude of the said carrier and various sidebands, producing potential variations characteristic of the amplitude of said impulses, producing an electron stream, applying said potentials to said electron stream to influence the path thereof to thereby produce visual indications, producing other potentials which are a function of the frequency difference between said carrier and said sidebands, and applying said other potentials to said electron stream to influence the path thereof.

7. A monitoring device to be used to analyze the character of energy resulting from the modulation of a carrier wave by modulating potentials comprising in combination, a receiver, a cathode ray tube having an electron stream producing device and sets of deflecting plates adjacent said stream, a connection between the output of said receiver and one set of said deflecting plates, means for tuning said receiver through a frequency range equal to the frequency band covered by said carrier and the main sidebands produced by said modulation, and means for simultaneously applying a potential difference between another set of said plates which varies between predetermined limits as the tune of said receiver is varied through said frequency range.

8. A monitoring device to be used to analyze the character of energy resulting from the modulation of a carrier by modulating potentials comprising in combination, a receiver, a cathode ray tube having an electron stream producing device, a target and sets of deflecting plates adjacent said stream, a connection between the output of said receiver and one set of said deflecting plates, means for tuning said receiver through a frequency range equal to the frequency band covered by said carrier and the main sidebands produced by said modulation whereby the path of said stream is influenced by the amplitude changes in the energy resulting from said modulation, and means for simultaneously applying a potential difference between another set of said plates which varies between predetermined limits as the tune of said receiver is varied through said frequency range to also influence the path of said stream.

9. A monitoring device to be used to analyze the character of energy resulting from the modulation of a carrier by modulating frequency comprising in combination, a receiver, a cathode ray tube having an electron stream producing device, a target, a set of deflecting plates for horizontally deflecting said stream and a set of deflecting plates for vertically deflecting said stream, a connection between the output of said receiver and said first set of deflecting plates, means for tuning said receiver through a frequency range equal to the frequency band covered by said carrier and the main sidebands produced by said modulation, and means for simultaneously applying a potential difference between the second set of said plates which varies between predetermined limits as the tune of said receiver is varied through said frequency range.

10. A radio receiver including an amplifier, a local oscillator and a demodulator connected to said amplifier and said local oscillator, an intermediate frequency amplifier connected to said demodulator, a rectifier connected to said intermediate frequency amplifier, a cathode ray tube having an electron stream producing system and sets of deflecting plates adjacent the normal path of said stream, a coupling between the output of said rectifier and a pair of said plates, a variable source of direct current connected with another pair of said plates, and means for varying the potential of said source and the tune of said oscillator simultaneously.

11. A radio receiver including a tuned radio frequency amplifier, a local oscillator including tuning means and a demodulator connected to said tuned amplifier and said local oscillator, an intermediate frequency amplifier connected to said demodulator, a rectifier connected to said intermediate frequency amplifier, a cathode ray tube having an electron stream producing system and sets of deflecting plates adjacent the normal path of said stream, a coupling between the output of said rectifier and a pair of said plates, a variable source of direct current connected with another pair of said plates, and means for varying the potential of said source of direct current and the tune of said oscillator and the tune of said amplifier simultaneously.

12. A radio receiver including a tuned radio frequency amplifier, a tuned local oscillator and a demodulator connected to said amplifier and said local oscillator, an intermediate frequency amplifier connected to said demodulator, a full wave rectifier connected to said intermediate frequency amplifier, a cathode ray tube having an electron stream producing system and a first pair of deflecting plates mounted on an axis passing through the normal path of said stream, and a second pair of deflecting plates mounted on an axis passing through the normal path of said stream at an angle with respect to said first named axis, a coupling between the output of said rectifier and said first pair of said plates, a variable source of direct current connected with said second pair of said plates, and means for continuously varying the potential of said source and the tune of said oscillator simultaneously.

13. In a monitoring device to be used to analyze the character of wave energy resulting from the modulation of a carrier wave by modulating potentials, wave amplifying means and demodulating means which when energized has an output the amplitude of which is characteristic of a narrow band of frequencies impressed on the input, means for impressing said wave energy on said amplifying means, a cathode ray tube having an electron stream producing device and sets of deflecting plates adjacent said stream, a connection between the output of said demodulating means and one set of said deflecting plates, means for tuning said amplifying means through a frequency range equal to the frequency band covered by the carrier and the main side bands of said wave energy produced by modulation, and means for simultaneously applying a potential difference between another set of said plates which varies between predetermined limits as the tune of said amplifying means is varied through said frequency range.

14. In a radio receiver, modulated wave intercepting and amplifying means which is tunable, a tunable local oscillator, a demodulator connected to said amplifying means and to said local oscillator, a sharply tuned intermediate frequency amplifier connected to said demodulator, a cathode ray tube having an electron stream producing system and sets of deflecting plates adjacent the normal path of said stream, a coupling between the output of said intermediate frequency amplifier and a pair of said plates, a variable source of direct current connected with another pair of said plates, and means for varying the potential of said source and the tune of said amplifying means and oscillator simultaneously.

15. The method of analyzing energy comprising a carrier wave and the side band frequencies which result from modulating said carrier wave in accordance with signals which include the steps of, successively resonating energy characteristic of the various frequencies in the frequency spectrum covered by said carrier and side bands, producing impulses the amplitude of which are characteristic of the intensity of the resonated energy, synchronously producing potentials the amplitude of which are characteristic of spacing of the frequencies of said spectrum covered by said carrier and side band, producing an electron stream the path of which is controllable, controlling the path of said stream in accordance with the amplitude of said potentials characteristic of the intensity of said resonated energy and controlling the path of said stream in accordance with said synchronously produced potentials.

16. A radio receiver including a tunable radio frequency amplifier, a tunable local oscillator, a demodulator connected to said amplifier and to said local oscillator, an intermediate frequency amplifier connected to said demodulator, a full wave rectifier connected to said intermediate frequency amplifier, a cathode ray tube having an electron stream producing system and a first pair of deflecting plates mounted on an axis passing through the normal path of said stream, and a second pair of deflecting plates mounted on an axis passing through the normal path of said stream at an angle with respect to said first named axis, a coupling tube having a control grid normally biased to cut off said tube having an output electrode, a coupling between the output of said rectifier and said control grid, a coupling between said output electrode and said first pair of said deflecting plates, a variable source of direct current connected with said second pair of deflecting plates, and means for continuously varying the potential of said source of direct current and the tune of said radio frequency amplifier and said oscillator simultaneously.

HAROLD H. BEVERAGE.